United States Patent
Thomas et al.

(10) Patent No.: US 12,164,283 B2
(45) Date of Patent: Dec. 10, 2024

(54) METHOD AND INDUSTRIAL CONTROLLER FOR THE SYNCHRONIZED CALLING OF A FUNCTION BLOCK IN A CONTROL PROGRAM HAVING OPC UA

(71) Applicant: Phoenix Contact GmbH & Co. KG, Blomberg (DE)

(72) Inventors: Uwe Thomas, Oerlinghausen (DE); Andreas Weichelt, Kirchlengern (DE)

(73) Assignee: Phoenix Contact GmbH & Co. KG (DE)

( * ) Notice: Subject to any disclaimer, the term of this patent is extended or adjusted under 35 U.S.C. 154(b) by 329 days.

(21) Appl. No.: 17/638,838

(22) PCT Filed: Aug. 28, 2020

(86) PCT No.: PCT/EP2020/074059
§ 371 (c)(1),
(2) Date: Feb. 27, 2022

(87) PCT Pub. No.: WO2021/038028
PCT Pub. Date: Mar. 4, 2021

(65) Prior Publication Data
US 2022/0276641 A1  Sep. 1, 2022

(30) Foreign Application Priority Data

Aug. 30, 2019 (DE) ..................... 10 2019 123 271.6

(51) Int. Cl.
*G05B 19/418* (2006.01)
(52) U.S. Cl.
CPC ..... *G05B 19/4185* (2013.01); *G05B 19/4183* (2013.01); *G05B 19/41865* (2013.01)

(58) Field of Classification Search
None
See application file for complete search history.

(56) References Cited

U.S. PATENT DOCUMENTS

| | | | |
|---|---|---|---|
| 5,598,149 A | 1/1997 | Schreiter et al. |
| 8,423,608 B2 | 4/2013 | Mahnke |
| (Continued) | | |

FOREIGN PATENT DOCUMENTS

| | | |
|---|---|---|
| CN | 101903837 A | 12/2010 |
| CN | 108199897 A | 6/2018 |
| (Continued) | | |

OTHER PUBLICATIONS

OPC Foundation, "OPC Unified Architecture Part 4: Services", Nov. 2017, OPC Foundation OPC Unified Architecture Release 1.04, pp. 60 (Year: 2017).*

(Continued)

*Primary Examiner* — David Earl Ogg
(74) *Attorney, Agent, or Firm* — John Maldjian, Esq.; Stevens & Lee PC

(57) ABSTRACT

A method for calling a function block of a control program of an industrial controller is disclosed. The industrial controller has an OPC UA server and communicates with an OPC UA client, wherein the function block is requested from an OPC UA call of the OPC UA client. When the function block is requested, an OPC UA call directed thereto is sent from the OPC UA client to the OPC UA server. The OPC UA call is stored by the OPC UA server. IN Parameters transferred together with the OPC UA call are then copied to corresponding IN parameters of the function block and, the function block is called at a previously defined point within a control task of the industrial controller and the IN parameters of the function block are processed.

9 Claims, 1 Drawing Sheet

(56) References Cited

U.S. PATENT DOCUMENTS

| | | | |
|---|---|---|---|
| 8,724,640 B2 | 5/2014 | Gerdes et al. | |
| 9,632,494 B2 | 4/2017 | Neubert et al. | |
| 10,313,268 B2 | 6/2019 | Goetz et al. | |
| 10,530,897 B2 | 1/2020 | Goetz et al. | |
| 10,908,574 B2 | 2/2021 | Macha et al. | |
| 11,088,962 B2 | 8/2021 | Chen et al. | |
| 2002/0194365 A1 | 12/2002 | Jammes | |
| 2007/0147268 A1 | 6/2007 | Kelley et al. | |
| 2009/0282165 A1 | 11/2009 | Jammes | |
| 2010/0131076 A1 | 5/2010 | Colombo et al. | |
| 2010/0281097 A1* | 11/2010 | Mahnke | H04L 67/125 709/227 |
| 2010/0306313 A1* | 12/2010 | Mahnke | G06F 9/466 709/203 |
| 2011/0144931 A1 | 6/2011 | Smit | |
| 2012/0029656 A1 | 2/2012 | Colombo et al. | |
| 2012/0188063 A1 | 7/2012 | Abbot et al. | |
| 2012/0265360 A1 | 10/2012 | Smit | |
| 2015/0018980 A1* | 1/2015 | Heutger | G05B 15/02 700/20 |
| 2015/0149745 A1* | 5/2015 | Eble | G06F 9/526 712/216 |
| 2017/0163768 A1 | 6/2017 | Deiretsbacher et al. | |
| 2017/0272366 A1 | 9/2017 | Bush et al. | |
| 2018/0024537 A1 | 1/2018 | Chauvet et al. | |
| 2018/0084055 A1 | 3/2018 | Mong | |
| 2018/0237039 A1 | 8/2018 | Mong et al. | |
| 2018/0237040 A1 | 8/2018 | Mong et al. | |
| 2018/0321662 A1 | 11/2018 | Nixon et al. | |
| 2019/0286076 A1* | 9/2019 | Caldwell | G05B 13/04 |

FOREIGN PATENT DOCUMENTS

| | | |
|---|---|---|
| DE | 41 25 374 A1 | 2/1993 |
| DE | 199 06 695 A1 | 8/2000 |
| DE | 102 27 241 A1 | 1/2004 |
| DE | 10 2006 058 282 A1 | 6/2008 |
| DE | 10 2007 043 652 A1 | 4/2009 |
| DE | 10 2007 062 986 A1 | 6/2009 |
| DE | 10 2007 062985 A1 | 6/2009 |
| DE | 10 2008 037 446 A1 | 5/2010 |
| DE | 10 2008 057 751 B4 | 5/2010 |
| DE | 10 2011 053 757 A1 | 3/2013 |
| DE | 10 2012 011 295 A1 | 12/2013 |
| DE | 10 2012 214 846 A1 | 2/2014 |
| DE | 10 2015 003 219 A1 | 9/2016 |
| EP | 0 698 837 B1 | 2/1996 |
| EP | 2 048 561 A2 | 4/2009 |
| EP | 2 325 748 A1 | 5/2011 |
| EP | 1 068 708 B1 | 3/2012 |
| EP | 2 506 098 B1 | 3/2016 |
| EP | 3 018 958 A1 | 5/2016 |
| EP | 3 088 971 A1 | 11/2016 |
| EP | 3182235 A1 * | 6/2017 |
| EP | 3 295 266 A1 | 3/2018 |
| EP | 3 182 235 B1 | 3/2019 |
| WO | 03/088620 A1 | 10/2003 |
| WO | 2005/059572 A1 | 6/2005 |
| WO | 2006/079569 A1 | 8/2006 |
| WO | 2014/044298 A1 | 3/2014 |
| WO | 2015/169352 A1 | 11/2015 |
| WO | 2015/188822 A1 | 12/2015 |
| WO | 2015188852 A1 | 12/2015 |
| WO | 2017/028932 A1 | 2/2017 |
| WO | 2018/141435 A1 | 8/2018 |
| WO | 2019/007516 A1 | 1/2019 |

OTHER PUBLICATIONS

International Search Report and Written Opinion mailed Oct. 22, 2020, issued in connection with corresponding International application No. PCT/EP2020/074059 with English translation (16 pages total).

German Office Action mailed May 18, 2020, issued in connection with corresponding German Application No. 10 2019 123 271.6 with English translation (13 pages total).

International Preliminary Report on Patentability issued Mar. 1, 2022 in connection with corresponding international application No. PCT/EP2020/074059—English translation only—(9 pages total).

Chinese Office action and Search Report issued Jun. 28, 2024 in connection with Chinese patent application No. 202080061070.1 (19 pages total).

* cited by examiner

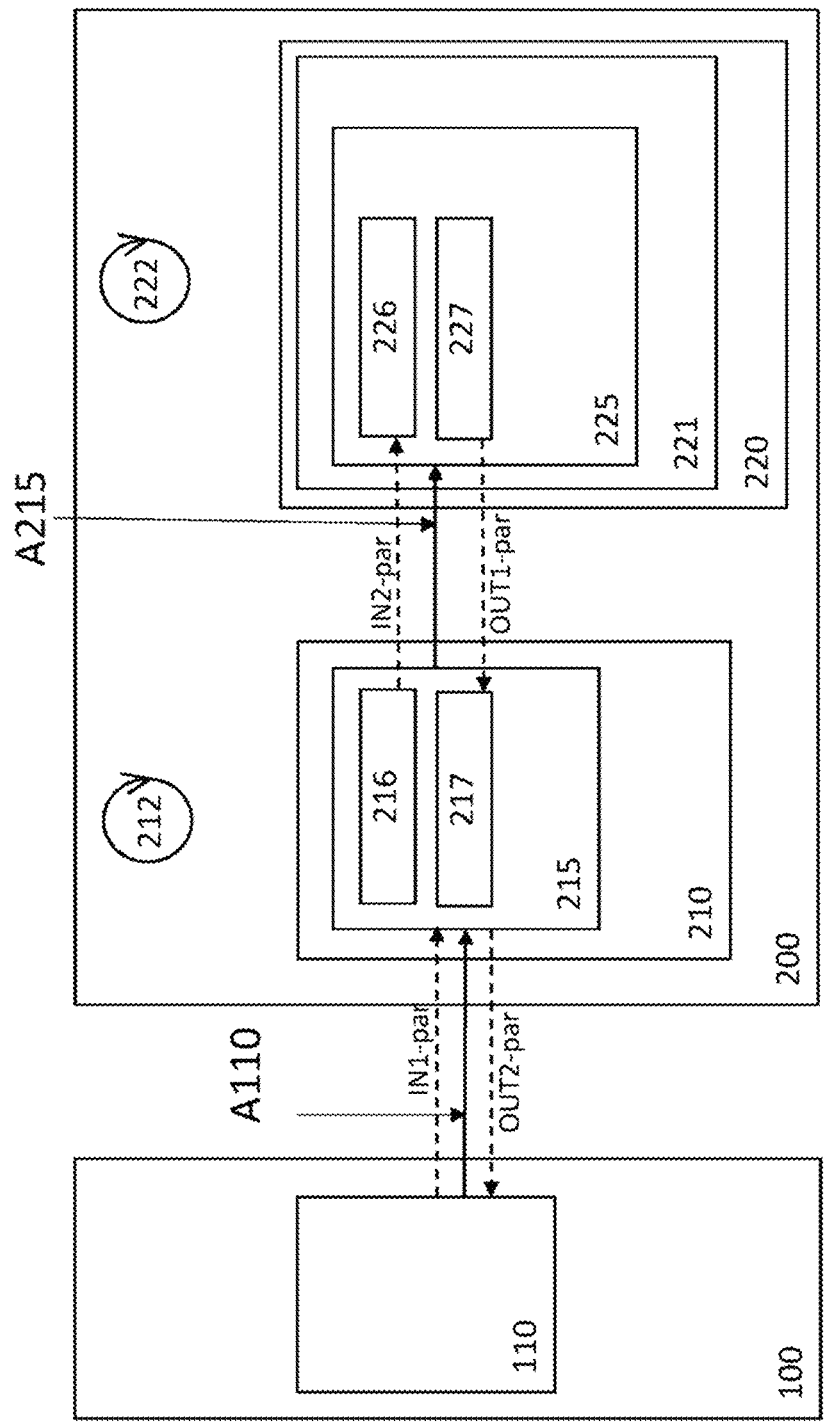

METHOD AND INDUSTRIAL CONTROLLER FOR THE SYNCHRONIZED CALLING OF A FUNCTION BLOCK IN A CONTROL PROGRAM HAVING OPC UA

CROSS-REFERENCE TO RELATED APPLICATIONS

This application claims the benefit under 35 U.S.C. § 371 of International Application No. PCT/EP2020/074059 filed on Aug. 28, 2020, which in turn claims the benefit of German Application No. 10 2019 123 271.6 filed on Aug. 30, 2019, the entire contents of each of which are hereby incorporated by reference in their entirety.

FIELD

Embodiments of the invention relate to a method for calling of a function block of a control program of an industrial controller, wherein the industrial controller has an OPC UA server and communicates with an OPC UA client by means of the OPC UA communication protocol, and wherein the function block of the control program is requested by the OPC UA client by a call of a method of the OPC UA server. Furthermore, the invention relates to a suitably adapted industrial controller for carrying out the method.

Traditionally, programmed controllers process a control code, which is to say, an executable program piece, contained in a control program in tasks, which is to say, application-related, interrelated tasks, which are called up cyclically by a "thread", which is to say, an execution thread or execution sequence, of the controller.

Furthermore, as is well known, methods, functions and function blocks can be used in a PLC program ("PLC"=programmable logic controller). Methods, as well as functions, are usually state-independent, or alternatively have no internal status information, which is to say, all parameters are transferred at the time of a respective call and are not stored. Function blocks, on the other hand, are program organizational units that are usually stateful and as a consequence maintain the parameters as part of their state. It is therefore possible to read and/or write the parameters of a function block at a different time than the call of the function block.

OPC UA servers ("OPC UA"; open platform communications unified architecture) can in turn provide methods that are requested by OPC UA clients. The method is then usually called up in the context of an OPC UA thread, which receives the request from an OPC UA client. Here, all input parameters are consistently passed on to the method and after execution all output parameters are consistently returned.

However, if an OPC UA server were to call the control code of the control program directly after calling the method, as a consequence it is possible that the control program would still be processed in parallel, which in turn could lead to inconsistencies in the returned parameters or the data processed in the control program.

BACKGROUND

Solutions are already known from the state of the art that allow OPC UA methods to be called up in a PLC program. Here, however, the OPC UA method is usually mapped as a PLC method or PLC function, which requires the parameters in the context of the call. One disadvantage of this method is, among other things, that the call must therefore occur either automatically before or after a task code in order to avoid inconsistencies, which, however, takes away the control of the user over the time point of processing, or that additional system functions must be called upon in order to transfer the parameters. The latter is known, for example, from EP 3 182 235 B1, which relates to method and an industrial controller for calling a function of a control program by means of an OPC UA call. Here, in a first step, an OPC UA call directed to calling the function is sent from an OPC UA client to the OPC UA server of the industrial controller. In a second step, the OPC UA call is stored by a system program of the industrial controller, and in a third step, a system function of the control program is called up at a defined point of the industrial control program, which checks whether an OPC UA call is stored, in such a way that in a fourth step, if such an OPC UA call is present, the function of the control program associated with this call is called up, and otherwise the industrial control program is continued without branching off to the function.

Although it is true that the method described in EP 3 182 235 B1 makes it possible to call a defined function or alternatively a defined function block at a previously defined point in the control program by means of the OPC UA call, this does however require, as mentioned above, the call of at least one additional system function, which as a consequence must initially, additionally, be accordingly set up in order to verify the presence of an OPC UA call. Thus, there is a need for an improved way to call a function block in a control program for processing.

SUMMARY

An embodiment of the present invention comprises a way to call a function block in a control program for processing starting from an OPC UA client via a method of an OPC UA server without requiring such an additional system function.

Another embodiment of the present invention comprises a method according to the appended patent claim 1, wherein useful embodiments and further embodiments are the subject of the subclaims. A further embodiment of the present invention is described as an industrial controller according to the appended claim 7.

Another embodiment of the present invention comprises a method for calling a function block of a control program of an industrial controller, in which the industrial controller has an OPC UA server and communicates with an OPC UA client by means of the OPC UA communication protocol, wherein the function block is called up starting from an OPC UA call of the OPC UA client, which is to say, is called up for processing, in particular being called up starting from the OPC UA client via a method of the OPC LTA server.

According to another embodiment of the present invention, there is provided a method, wherein when the function block is requested, in a first step a call directed thereto, which is to say, in particular a call accordingly directed to the method of the OPC UA server, is sent from the OPC UA client to the OPC UA server, and in a second step the OPC UA call is stored by the OPC UA server of the industrial controller. In a third step, IN parameters transferred together with the OPC UA call, which is to say, IN parameters transferred from the OPC UA client to the OPC UA server, are copied on to corresponding IN parameters of the function block of the control program and, in a fourth step, the function block of the control program is called up at a previously defined point within a control task of the industrial controller and the IN parameters of the function block are processed.

A significant advantage is therefore that the function block itself is processed within a thread context of the control program and thus inconsistencies are avoided and, before the function block is processed, the IN parameters transferred by means of the call directed from the OPC UA client to the OPC UA server are first consistently transferred to the control program.

A further embodiment of the present invention comprises an industrial controller for synchronized calling of a function module in a control program. Another embodiment comprises an industrial controller with an OPC UA server, wherein the industrial controller is set up to run a control program and to communicate, in particular by means of the OPC UA communication protocol, with an OPC UA client and is furthermore set up to call a function block of the control program, which can be requested starting from an OPC UA call of the OPC UA client.

According to another embodiment, the OPC UA server is further designed to receive an OPC UA call directed to the request from the OPC UA client and to store the OPC UA call. Furthermore, the industrial controller copies IN parameters transferred together with the OPC UA call to corresponding IN parameters of the function block of the control program and calls the function block of the control program at a previously defined point within a control task of the industrial controller.

The advantages already discussed with reference to the method are also realized by this industrial control system.

In a further embodiment of the present invention, the method is comprises the industrial controller is set up, such that OUT parameters of the function block of the control program obtained by execution of the control task, and thus during processing of the function block of the control program, are copied to the OPC UA server after execution of the control task.

A further embodiment of the present invention comprises OUT parameters requested by means of the call directed by the OPC UA client to the OPC UA server and based on the transferred IN parameters are also consistently transferred from the control program to the OPC UA server. Another embodiment comprises the OUT parameters of the function block, which comprises a parameter for signaling a processing status and/or an error during the processing of the function block based on the OPC UA call.

Furthermore, in an embodiment, it is preferably provided that the OUT parameters copied to the OPC UA server are returned by the OPC UA server to the OPC UA client.

In another embodiment, it is furthermore provided that the IN parameters of the function block comprise a parameter for signaling the presence of an OPC UA call.

In another embodiment of the present invention, it is furthermore expediently provided that, for example, at the end of the execution of the control task, at least the IN parameter copied to the function block of the control program for signaling the presence of an OPC-UA call is reset to a default value.

BRIEF DESCRIPTION OF THE DRAWINGS

Further advantages and features of the invention in preferred embodiments are described in more detail from the following description, with reference to the attached drawing.

FIG. 1 shows a principle sketch of essential function blocks of an industrial control system as well as a client accessing it in a highly schematized representation.

DETAILED DESCRIPTION

FIG. 1 schematically shows some useful software components of an industrial controller 200, which is preferably a programmable logic controller, and of a client 100.

More specifically, a control task 220 to be processed during a control thread 222 is shown in in the industrial controller 200 of an expedient embodiment, which in turn is designed to process a control program 221.

The industrial controller 200 may further comprise further control tasks which may be called within the control thread 222 or also other control threads, in particular cyclically for processing further control programs. As is known to one skilled in the art in and of itself, control programs, also referred to as application programs, conventionally serve to control or monitor an application, for example, within an industrial process or industrial manufacturing. Within the scope of these applications, corresponding function blocks, such as the function block 225, can then be called, which are designed to be application-dependent for processing a specific application or even function.

The control program 221 outlined at FIG. 1 here comprises a function block 225 which is accordingly set up to process IN parameters 226 to OUT parameters 227. As a consequence, in a practical embodiment, a function block, generally speaking, comprises a defined function for processing certain input parameters, wherein, after processing of the function block, output parameters based on the input parameters and the function are obtained, which can be transferred as output parameters of the function block for further processing and/or can be written to a memory area provided for this purpose on the industrial controller, but not shown in more detail.

In particular, in order to avoid inconsistencies between the IN parameters 226 and the OUT parameters 227, the industrial controller 200 is furthermore expediently designed such that the processing of the function block 225 always takes place, in particular takes place cyclically, during the control thread 222 at a previously defined point within the control task 220.

Furthermore, the industrial controller 200 also comprises, in particular as part of or as an extension of an operating system not shown in more detail, an OPC UA server 210 for communication, which is to say, in particular for the exchange of data, between the industrial controller and a client 100 arranged externally to the industrial controller, wherein, in this respect, an OPC UA client 110 is set up on the client 100 for communication. The communication or alternatively the exchange of data between the industrial controller 200 and the client 100 is thus carried out via the OPC UA server 210 and the OPC UA client 110, expediently by means of an OPC UA communication protocol known per se to the person skilled in the art.

A method 215 is further defined on the OPC UA server 210, which is preferably directed to the call A215 of the function corresponding to the function block 225 of the control program, and can be called via a call A110 of the OPC UA client 110.

In particular, within the scope of such a call A110, it is provided that, together with the call A110, certain IN parameters 216, indicated in FIG. 1 by the dashed arrow shown between the OPC UA client 110 and the OPC UA server 210 and marked with "IN1-par", are first transferred from the OPC UA client 110 to the OPC UA server 210, such that these IN parameters 216 are processed according to a certain rule, which is to say, in particular according to the function corresponding to the function block 225, and subsequently, OUT parameters 217, indicated in FIG. 1 by the dashed arrow shown between OPC UA client 110 and the OPC UA server 210 and marked with "OUT2-par", obtained therefrom are expediently returned from the OPC UA server 210 to the OPC UA client 110. The special processing instruction is stored in the function block 225 of the control program 221, so that, in other words, the method 215 is represented by the function block 225 in the control program 221.

As a consequence, a request of the function block 225, which is to say, the request for a processing of specific IN parameters to OUT parameters can, in particular, ensue spontaneously or at any moment from the industrial process or the industrial production and thus external to the industrial control system.

Preferably, it is provided that the method 215 called by the call A110 is processed by the OPC UA server 210 within a corresponding UA thread 212. In this case, a call A110 is consequently received by the OPC UA client 110, if present, and expediently the IN parameters 216 received with the call of the method from the OPC UA client are on the one hand stored in the OPC UA server 210 and on the other hand copied to the IN parameters 226 of the function block 225 of the control program 221, indicated in FIG. 1 by the dashed arrow shown between the OPC UA client server 210 and the function block 225 and marked with "IN2-par". In addition, within this thread 212, or alternatively in a subsequent thread, the OUT parameters 227 of the function block correspondingly received from the control program 221 after processing the IN parameters 226 are copied to the OPC UA server 215 as OUT parameters 217, indicated in FIG. 1 with the dashed arrow shown between the OPC UA server 210 and the function block 225 and marked with "OUT1-par". Accordingly, the OPC UA server 210 returns the OUT parameters 217 to the OPC UA client 110 in this thread or in a subsequent thread (cf. "OUT2-par").

The dashed arrows between the components in FIG. 1 indicate therein the flow of data or alternatively parameters, and the solid lined arrows between the components in FIG. 1 indicate the flow of control. A preferred method for requesting the function block (225) accordingly provides that the OPC UA client 110 calls the method 215 of the OPC UA server 210 and accordingly transfers IN parameters to the OPC UA server (cf. "IN1-par"). This call, together with the IN parameters 216, is stored by the OPC UA server 210. Subsequently, the IN parameters 216 of the method 215 are then copied to the IN parameters 226 of the function block 225 of the control program 221 (cf. "IN2-par"). When the control task 220 is then next called for execution, expediently cyclically, by the control thread 222, the control program 221 again calls the function block 225 within the control task 220, processes the last copied IN parameters 226, and writes the OUT parameters 227 of the function block 225 currently received thereby. After execution of the control task 220, the OUT parameters 227 for the method 215 are copied to the OPC UA server 210 (cf. "OUT1-par"). The OPC UA server can then return them to the OPC UA client 110 in the thread 212 (cf. "OUT2-par").

Expediently, the IN parameters 226 additionally contain a parameter for signaling the presence of an OPC UA call. If such an IN parameter is consequently copied to a corresponding parameter input of the function block 225, it signals to the function block that a call from the OPC UA server is pending. This IN parameter signaling a pending call can preferably be reset by the control program 221 or also by the OPC UA server 210, for example, at the end of the execution of the control task, which is to say, in particular, reset to a default value. By means of such a default value, it is thus expediently signaled that no renewed OPC UA call and thus no renewed processing of the function block is pending. Alternatively, the reset could also take place before the start of the next execution of the control task.

In an alternative or complementary preferred embodiment, the OUT parameters 227 of the function block 225 receive, after processing of the IN parameters 226, at least one further parameter which signals a processing status and/or an error during the processing of the function block based on the OPC UA call.

In particular, this can consequently signal the function block that the method call A215 for calling the function block has been completely processed and/or an error code relating to the processing can be represented, which can expediently be returned to the OPC UA client 110 in the event of an error.

Significant advantages of the method according to the invention are consequently to be seen in the fact that, in the case of a call of an OPC UA client for a function block in a control program via a method of an OPC UA server, the function block can be processed in the thread context of the control program, the in-parameters of the method are consistently transferred to the control program, wherein on the basis of the processing of the function block 225 at a previously defined point within a control task 220, a user of the control program always retains complete control over the point in time of the processing of the function block, and the OUT parameters of the method can expediently be transferred in a consistent manner from the control program to the OPC UA server. As a consequence, there is no need for an additional system function, in particular similar to the method described in EP 3 182 235 B1, for verifying whether an OPC UA call is stored, which once again speeds up the overall processing.

In a practical embodiment, an industrial controller 200 as sketched in FIG. 1 with the OPC UA server 210 is thus designed to run the control program 221 and to communicate, in particular by means of the OPC UA communication protocol, with an OPC UA client 110 and also to call the function block 225 of the control program 221, which can be requested from an OPC UA call of the OPC UA client 110, wherein the OPC UA server 210 is designed for receiving an OPC UA call directed to the request from the OPC UA client 110 and for storing the OPC UA call. As previously described in a preferred embodiment, the industrial controller 200 is thus expediently further designed to copy IN parameters 216 transferred along with the OPC UA call to corresponding IN parameters 226 of the function block 225 of the control program 221 and to call the function block 225 of the control program 221 at a previously defined point within a control task of the industrial controller 200 to process the IN parameters of the function block 225.

The invention claimed is:

1. A method for calling a function block of a control program of an industrial controller, wherein
the industrial controller comprises an open platform communications unified architecture (OPC UA) server,
the industrial controller communicates with an OPC UA client,
and the function block is requested starting from an OPC UA call of the OPC UA client, wherein when the function block is requested:
an OPC UA call directed thereto is sent from the OPC UA client to the OPC UA server of the industrial control characterized in that,
the OPC UA call is stored by the OPC UA server of the industrial controller,
IN parameters transferred together with the OPC UA call are copied to corresponding IN parameters of the function block of the control program, and then
at a previously defined point within a control task of the industrial controller, the function block of the control program is called and the IN parameters of the function block are processed.

2. The method according to claim 1, wherein OUT parameters of the function block obtained by execution of the control task during processing of the IN parameters of the function module of the control program are copied to the OPC UA server after execution of the control task.

3. The method according to claim 2, wherein the OUT parameters additionally comprise at least one parameter for signaling a processing status and/or an error during the OPC UA call-based processing of the function block.

4. The method according to claim 2, wherein the OUT-parameters copied to the OPC UA server are returned from the OPC UA server to the OPC UA client.

5. The method according to claim 1, wherein the IN parameters comprise a parameter for signaling the presence of the OPC UA call.

6. The method according to claim 5, wherein at the end of the execution, or prior to the start of the next execution of the control task, at least the IN parameter copied to the function block of the control program is reset to a default value to signal the presence of an OPC UA call.

7. An industrial controller having an open platform communications unified architecture (OPC UA) server, wherein the industrial controller is designed to run a control program, wherein the industrial controller is designed to communicate with an OPC UA client, as well as furthermore to call a function block of the control program, which function block can be requested starting from an OPC UA call of the OPC UA client, wherein the OPC UA server is designed for receiving an OPC UA call directed to the request from the OPC UA client, characterized in that the OPC UA server is further designed for storing the OPC UA call, and the industrial controller is further designed for copying IN parameters transferred together with the OPC UA call to corresponding IN parameters of the function block of the control program and for calling the function block of the control program at a previously defined point within a control task of the industrial controller for processing the IN parameters of the function block.

8. The method according to claim 1, wherein the industrial controller communicates with the OPC UA client by using an OPC UA communication protocol.

9. The industrial controller according to claim 7, wherein the industrial controller is designed to communicate with the OPC UA client by using an OPC UA communication protocol.

* * * * *